United States Patent [19]

Marr et al.

[11] 3,873,150

[45] Mar. 25, 1975

[54] SLIDING ROOF CONSTRUCTION FOR A MOTOR VEHICLE

[75] Inventors: Fritz Marr, Offenbach; Albert Schlapp, Sprendlingen; Rainer Hattass, Rothenbergen; Edmund Binder, Dreieichenhain, all of Germany

[73] Assignee: H. T. Golde GmbH, Frankfurt, Germany

[22] Filed: Oct. 3, 1973

[21] Appl. No.: 402,911

[30] Foreign Application Priority Data
Oct. 11, 1972 Germany.............................. 2249718

[52] U.S. Cl. ........................................ 296/137 H
[51] Int. Cl. ............................................. B60j 7/04
[58] Field of Search........ 296/137 H, 137 E, 137 G; 49/449; 292/76

[56] References Cited
UNITED STATES PATENTS
2,041,281  5/1936  Bishop............................ 296/137 H
3,507,537  4/1970  Kouth et al....................... 49/211 X Primary Examiner—Stanley H. Tollberg
Assistant Examiner—John P. Shannon
Attorney, Agent, or Firm—Toren, McGeady and Stanger

[57] ABSTRACT

Within the opening in the roof of a motor vehicle, a ridig sliding cover is guided between its opened and closed positions by sliding shoes connected to the cover and mounted on guide rails. Sliding shoes at the forward end of the opening are locked in place in the closed position of the cover by a leaf spring attached to the guide rail and resiliently baised into a notch in the sliding shoe. As an alternative, the position of the leaf spring and the notch can be reversed on the sliding shoe and the guide rail. The leaf spring can be shaped to provide a stop for the forward movement of the sliding shoe.

7 Claims, 5 Drawing Figures

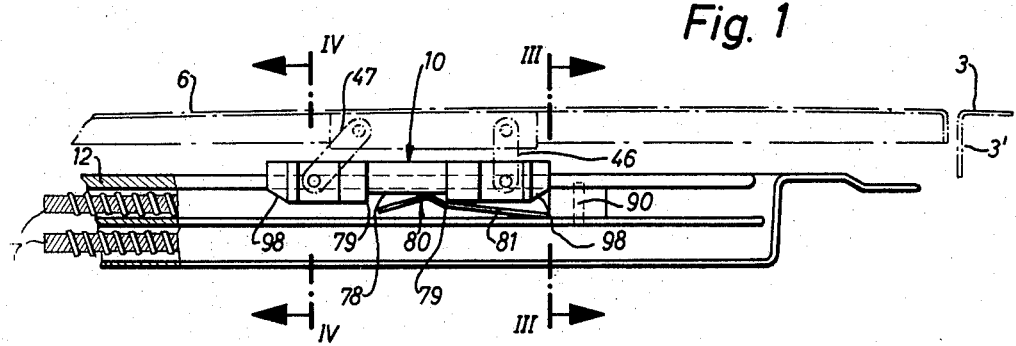
Fig. 1
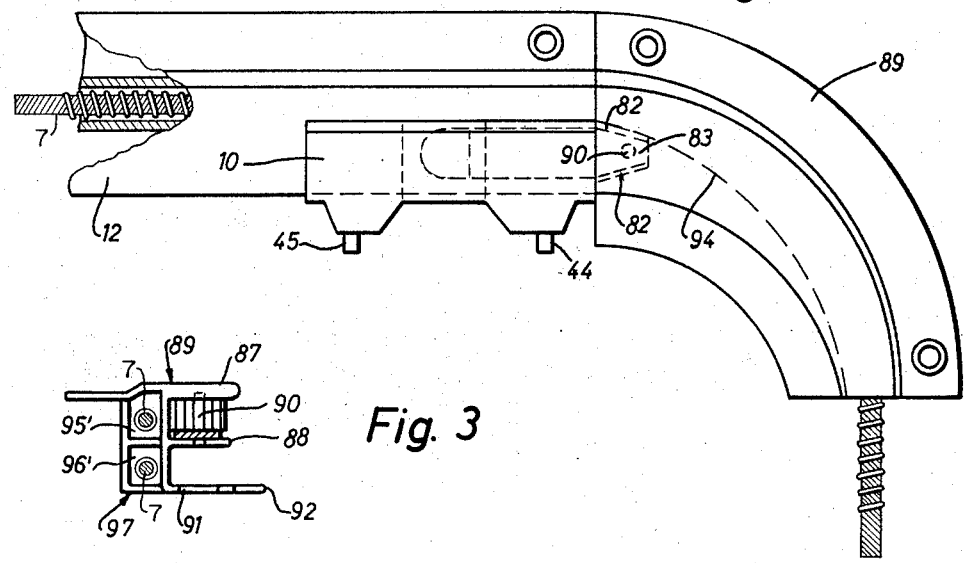
Fig. 2
Fig. 3
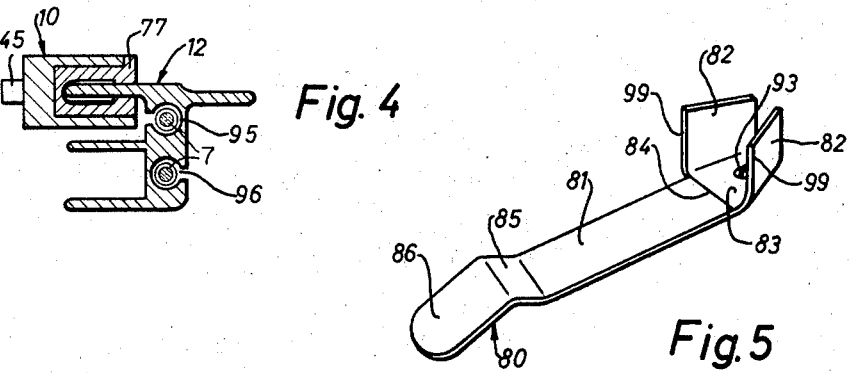
Fig. 4
Fig. 5

3,873,150

SLIDING ROOF CONSTRUCTION FOR A MOTOR VEHICLE cSUMMARY OF THE INVENTION

The present invention concerns an improvement in the construction of a sliding roof cover for a motor vehicle and, more particularly, it is directed to a member for securing the sliding cover in the closed position.

The present invention is an improvement on the arrangement disclosed in application Ser. No. 746,616, filed July 22, 1968, now U.S. Pat. No. 3,507,537, for which re-issue application No. 246,076 was filed on Apr. 20, 1972.

In application No. 746,616, the arrangement for the movement of the sliding cover in the roof of the motor vehicle was such that at its forward end the cover was mounted on sliding shoes for pivotal movement about a horizontal axis extending transverse to the sliding direction. To assure that the sliding cover is not moved in the sliding direction by its driving means when its rear edge is lowered, a stop is secured on one side of the cover in front of the pivot axis and it acts as a stationary stop which is disengaged at the end of the lowering movement of the rear side of the cover. The engagement of the stop surfaces is provided in a plane disposed perpendicularly to the sliding cover. Because of the stops, the sliding shoes attached to the forward end of the cover are not displaced during the retracting movement and the pivot axis remains stationary in the manner of a hinge.

This prior stop arrangement has proved quite satisfactory for the arrangement of the pivot. However, if the sliding cover is connected with the forward sliding shoes by a guide rod arrangement, such as a four rod linkage with a shorter front guide rod and a longer rear guide rod (see Deutsche Offenlegungsschrift No. 1 809 332), because of the 90° bevel of the front roof cutout edges and of the corresponding free swivel paths for the front transverse roof edges, the sliding cover no longer has a pivot axis which is stationary relative to it, since it is displaced during the movement of the sliding cover relative to the front sliding shoes and the stationary parts. As a result, the use of stop means which are stationary and at the same time secured to the cover presents difficulties in this type of sliding roof support.

Therefore, the problem to which the present invention is directed is the provision of a stop arrangement which remains fully effective though there are possible displacements of the pivot axis. In the solution of the problem according to the present invention, a notch is formed in at least one of the two sliding shoes located adjacent the forward end of the sliding cover or on a part connected with the shoe and a resilient member is provided with a nose or protuberance which seats within the notch when the sliding cover is in its forward or closed position. In such an arrangement, the stop surfaces previously provided on the sliding cover are eliminated. Therefore, the engaged position can be maintained independently of the displacement of the cover. If the sliding cover, after it is moved into the closed position and its rear edge is lowered, is in a suitable position for displacement under the rear fixed surface of the roof, the engaged position can be released by overcoming the spring force which biases the protuberance into the notch by means of the operating device for the sliding cover. On the other hand, if the sliding cover is moved into the closed position within the roof opening, the protuberance is guided into the notch when the forward stop surface for the sliding cover has been reached.

Preferably, the nose which engages in the notch is formed on the free end of a leaf spring which is secured at its other end to the guide rail at a point forward of the path of the sliding shoe. The portion of the leaf spring containing the nose and extending toward the free end is disposed at an acute angle with the guide bar on the guide rail on which the sliding shoe rides. This arrangement permits the displacement of the free end of the leaf spring so that a sufficient path of travel is afforded for the nose in its movement into and out of the notch.

A particularly simple and expedient design of the present invention involves the formation of the nose as a protuberance formed in the leaf spring itself.

It is also possible to secure the leaf spring on the forward upper corner part of the cable guide located at the forward end of the guide rail. In this arrangement, the end of the leaf spring attached to the cable guide is provided with clamping flanges which taper toward one another and engage the surfaces of the upper corner parts. The edges of the clamping flanges facing toward the guide rail form surface stops for the front sliding shoes attached to the sliding cover. Such an arrangement affords a particularly simple and reliable attachment of the lead spring outside of the path travel of the sliding shoe.

The various features of novelty which characterize the invention are pointed out with particularity in the claim annexed to and forming a part of this specification. For a better understanding of the invention, its operating advantages and specific objects attained by its use, reference should be had to the accompanying drawing and descriptive matter in which there is illustrated and described a preferred embodiment of the invention.

BRIEF DESCRIPTION OF THE DRAWING

In the drawing, FIG. 1 is a partial elevational view of a guide rail with a foward sliding shoe in its forwarad or closed position;

FIG. 2 is a top view of the arrangement shown in FIG. 1;

FIG. 3 is a sectional view taken along the line III—III in FIG. 1;

FIG. 4 is a sectional view taken along the line IV—IV in FIG. 1; and

FIG. 5 is a perspective view of a leaf spring arrangement.

DETAILED DESCRIPTION OF THE INVENTION

In the drawing, a fixed vehicle roof 3, a rigid sliding cover 6 and guide rods 46, 47 are indicated in broken lines. The sliding cover 6 is displacable from the closed position indicated into various open positions with the cover retracted from the forward surface 3' of the opening in the roof by means of cables 7. For simplicity's sake, only the front sliding shoe 10 connected to the cover 16 is shown, 6 rear sliding shoes, and the frame reinforcing for the opening in the roof closed by the cover are not shown. The cables 7 for effecting the movement of the cover are shown in FIGS. 1-4. Since the parts associated with the sliding cover are arranged along the longitudinal axis of the vehicle in mirror fashion, the invention will be described in relation to one sliding shoe 10 and the parts cooperating with it.

The sliding shoe 10, provided with an inserted plastic slide 77, note FIG. 4, is guided for longitudinal displacement along the guide rail 12. Spaced bolts 44,45 are formed on the sliding shoe and are secured into the guide rods 46,47 and provide a pivotal connection between the sliding cover 6 and the sliding shoe. This pivotal arrangement, which was provided because of the 90° bend formed by the front surface 3' defining the forward side of the opening in the roof, is not the subject of the present invention. The improvement afforded by the invention described herein can also be used in the pivotal arrangement described in application Ser. No. 746,616, where the pivot is stationary relative to the sliding shoe.

The sliding shoe 10, which is symmetrical for left-hand and right-hand use, has a notch 78, formed in its lower surface spaced from the forward and rearward ends of the shoe. Preferably, the edges 79 defining the forward and rearward sides of the notch are relatively sharp-edged. An elongated leaf spring 81 is located below and extends in the direction of the movement of sliding shoe 10, the leaf spring is connected at one end to the structure of the guide rail and its other end is free and, as shown in FIG. 1, is located below the sliding shoe 10 in its forward position. Adjacent its free end, the leaf spring 81 is formed to provide an upwardly extending protuberance or nose which is engageable within the notch 78 in the shoe. The attached end of the leaf spring is provided with an attachment plate 83 with a pair of clamping flanges 82 extending upwardly from the longitudinally extending edges of the plate. As can be seen in FIGS. 2 and 5, the flanges 82 converge inwardly toward one another toward the forward end of the leaf spring. At the rearward edge 84 of the attachment plate 83, the leaf spring 81 is bent slightly upwardly toward the undersurface of the sliding shoe 10, so that the spring forms an acute angle with the associated arm of the guide rail 12 on which the sliding shoe is positioned, this feature can best be noted in FIG. 1. This upwardly extending portion of the leaf spring insures that the nose 80 has a sufficient upward and downward travel stroke for its effective utilization. The nose 80, formed from the leaf spring 81 itself, is composed of a stop surface 85 and an inlet surface 86 extending rearwardly from the free end of the spring. The surfaces 85 and 86 enclose an obtuse angle. In the illustrated embodiment, the attachment end of the leaf spring 81 is fitted between the arms 87, 88 of an upper corner piece 89 of the cable guide located at the forward end of the guide rail 12. The shape of the flanges 82 and the attachment plate 83 are adapted to the configuration of the upper corner piece 89. The leaf spring is secured by a tension pin 90 which is inserted through a bore in the lower arm 92 of the upper corner piece and is held in position within bores in the arms 87,88, note FIG. 3, and extends through a corresponding bore 93 through the attachment plate 83, note FIG. 5.

As can be appreciated, the leaf spring 81 is also designed for both left-hand and right-hand use, since its angularly disposed clamping flanges are arranged symmetrically to one another. As indicated above, the flanges 82 are adapted to conform to the curved configuration of the inner wall surface 94, note FIG. 2, of the upper corner piece. The guide rail 12 is equipped in this embodiment in a known manner with superposed cable guide ducts 95,96, as shown in FIG. 4. Accordingly, cable guide ducts 95',96' in the upper corner piece 89 are disposed in a superposed arrangement. However, the invention can also be used effectively with guide rails in which the cables extend in side-by-side relationship, such as shown in the above mentioned application for which the present invention is an improvement.

In the operation of the present invention, the sliding cover 6 moves between a closed position within the opening in the roof 3 and opened positions with the cover spaced rearwardly from the front edge surface 3' of the roof opening. When the sliding cover 6 is moved forwardly to the closed position from a position below the rear surface of the roof 3, the forward end of the sliding shoe 10 contacts the inlet surface 86 on the nose 80 of the leaf spring 81 with a beveled surface 98, shortly before it reaches the forward stop position. The action of the beveled surface 98 contacting the leaf spring deflects the nose 80 downwardly against the biasing action of the spring. With the continued movement of the sliding shoe, the nose 80 slides along the underside of the shoe until it reaches the forward of notch 78 edge 79 and then is displaced upwardly into the notch 78. The upward movement of the nose 80 afforded by the biasing action of the spring 81 provides a resilient locking action for the sliding shoe. In this locked position the forward edge 79 of the notch of the sliding shoe rests on the stop surface 85 of the leaf spring. This locked engagement when the sliding shoe is in its forward or closed stop position is maintained until the rear edge of the sliding cover has been lowered for movement into an open position. During the opening movement of the sliding cover by the cable drive, the edge 79 on the sliding shoe rides over the stop surface 85 of the leaf spring until its nose 80 is displaced from the notch 78. The forward stop position as shown in FIGS. 1 and 2 is also maintained when the sliding cover is retracted from an open position, so that there is no undesired simultaneous displacement of the cover when it is retracted.

Instead of the stationary fastening of the leaf spring 81 with the notch 78 displaceable along with the sliding shoe, the locking or engaging arrangement could be reversed with equal efficiency. In such a reversed arrangement, the resiliently displacable nose 80 would be secured on the sliding shoe 10 and the notch formed in the guide rail 12.

As can be seen from FIGS. 1 and 2, along with FIG. 5, the edge surfaces 99 of the clamping flanges 82 serve as stop surfaces for the forward movement of the sliding shoe 10 and, therefore, also as stops for the sliding cover 6.

While a specific embodiment of the invention has been shown and described in detail to illustrate the application of the inventive principles, it will be understood that the invention may be embodied otherwise without departing from such principles.

What is claimed is:

1. In a motor vehicle body construction comprising a roof having an opening therein and the opening having a forward end and a rearward end, a rigid sliding cover movably displaceable within the opening in the direction between its forward and rearward ends so that it is movable between open and closed positions, guide rails located along the sides of the opening in said roof extending in the direction between the forward and rearward ends, sliding shoes connected to said cover and mounted on each of said guide rails, said sliding shoes on each said guide rail spaced apart in the direction of movement of said cover, cables in operative engagement with said sliding shoes for displacing said cover between the open and closed positions, wherein the improvement comprises means associated with at least one of said guide rails at the forward end of the opening in said roof and with said sliding shoe in at least one of the said guide rails located at the forward end of the opening in said roof in a closed position for releaseably securing said cover in the closed position, and said means comprises that one of said guide rails and said sliding shoe has a notch formed therein and the other one of said guide rails and said sliding shoe has a resilient member including a protuberance displaceably engageable within the notch.

2. In a motor vehicle body construction, as set forth in claim 1, wherein said resilient member comprises, an elongated leaf spring secured at one end to one of said guide rail and said sliding shoe and being free at its opposite end, and said protuberance is located adjacent the free end of said leaf spring.

3. In a motor vehicle body construction, as set forth in claim 1, wherein the notch is formed in said sliding shoe and said resilient member is an elongated leaf spring secured at one end to said guide rail and having its opposite end free, said protuberance formed in said leaf spring adjacent its free end and arranged to be seated within the notch in said sliding shoe.

4. In a motor vehicle body construction, as set forth in claim 3, wherein the end of said leaf spring secured to said guide rail is located forwardly of the position of said sliding shoe containing the notch when it is in the closed position, and said leaf spring is positioned below said sliding shoe containing the notch.

5. In a motor vehicle body construction, as set forth in claim 4, wherein said leaf spring has a first part attached to a planar surface on said guide rail and a second part extending in the elongated direction of said leaf spring from said first part and disposed at an acute angle to the planar surface of said guide rail and extending upwardly toward the lower surface of said sliding shoe.

6. In a motor vehicle body construction, as set forth in claim 5, wherein said guide rail includes a corner piece curved in the plane of movement of said cover in the opening in said roof and extending forwardly from the forward end of said guide rail, said first part of said leaf spring is connected to said corner piece and includes an attachment plate and a pair of flanges each secured to an opposite longitudinally extending edge of and extending upwardly from said attachment plate, said flanges disposed in converging relationship in the direction extending away from said second part of said leaf spring, and the ends of said flanges adjacent said second part of said leaf spring form a stop for said sliding shoe having the notch formed therein.

7. In a motor vehicle body construction, as set forth in claim 5, wherein sid second part has a first section extending from said first part in the elongated direction of said leaf spring and a second section forming said protuberance and extending in the elongated direction of said leaf spring from the end of said first section spaced from said first part to the free end of said leaf spring, said second section extending first upwardly from said first section and then reversing direction at a location intermediate its connection to said first section and the free end of said leaf spring and extending downwardly with the downwardly facing surface forming an obtuse angle at the location of its reversal in direction.

* * * * *